United States Patent
Jaffrennou et al.

(10) Patent No.: US 8,197,587 B2
(45) Date of Patent: *Jun. 12, 2012

(54) SIZING COMPOSITION FOR MINERAL WOOL COMPRISING A MONOSACCHARIDE AND/OR A POLYSACCHARIDE AND AN ORGANIC POLYCARBOXYLIC ACID, AND INSULATING PRODUCTS OBTAINED

(75) Inventors: Boris Jaffrennou, Paris (FR); Dominique Serughetti, Paris (FR); Jérôme Douce, Paris (FR)

(73) Assignee: Saint-Gobain Isover, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,391

(22) Filed: Dec. 23, 2011

(65) Prior Publication Data
US 2012/0090505 A1 Apr. 19, 2012

Related U.S. Application Data

(63) Continuation of application No. 12/746,101, filed as application No. PCT/FR2008/052203 on Dec. 4, 2008.

(30) Foreign Application Priority Data

Dec. 5, 2007 (FR) ...................................... 07 59580

(51) Int. Cl.
*C08L 3/02* (2006.01)
(52) U.S. Cl. ............. 106/205.31; 106/205.2; 106/205.3; 106/205.71
(58) Field of Classification Search ............... 106/205.2, 106/205.3, 205.31, 205.71
See application file for complete search history.

(56) References Cited

U.S. PATENT DOCUMENTS

| | | | |
|---|---|---|---|
| 2,204,384 A | 6/1940 | Salisbury | |
| 2,210,119 A * | 8/1940 | Edson et al. ............... | 106/205.6 |
| 2,378,378 A | 6/1945 | Bauer | |
| 3,340,083 A | 9/1967 | Robitschek | |
| 5,318,990 A | 6/1994 | Strauss | |
| 5,340,868 A * | 8/1994 | Strauss et al. ................. | 524/461 |
| 5,661,213 A * | 8/1997 | Arkens et al. ................. | 524/555 |
| 5,895,804 A * | 4/1999 | Lee et al. ..................... | 525/54.3 |
| 5,932,689 A | 8/1999 | Arkens et al. | |
| 5,977,232 A | 11/1999 | Arkens et al. | |
| 6,071,994 A | 6/2000 | Hummerich et al. | |
| 6,099,773 A | 8/2000 | Reck et al. | |
| 6,146,746 A | 11/2000 | Reck et al. | |

(Continued)

FOREIGN PATENT DOCUMENTS

EP 1 382 642 1/2004

(Continued)

OTHER PUBLICATIONS

International Search Report as issued for PCT/FR2008/052203, dated Aug. 3, 2009.

*Primary Examiner* — David M Brunsman
(74) *Attorney, Agent, or Firm* — Pillsbury Winthrop Shaw Pittman LLP

(57) ABSTRACT

A sizing composition for insulating products based on mineral wool, in particular on rock or glass, the composition including at least one dextrin, at least one organic polycarboxylic acid having a molar mass of less than or equal to 1000, and a catalyst chosen from Lewis acids and bases, phosphorus-comprising compounds and compounds including fluorine and boron.

30 Claims, 1 Drawing Sheet

U.S. PATENT DOCUMENTS

| | | |
|---|---|---|
| 6,299,936 B1 | 10/2001 | Reck et al. |
| 6,331,350 B1 | 12/2001 | Taylor et al. |
| 6,613,378 B1 | 9/2003 | Erhan et al. |
| 2002/0091185 A1 | 7/2002 | Taylor et al. |
| 2002/0188055 A1 | 12/2002 | Chen et al. |
| 2003/0008978 A1 | 1/2003 | Chen et al. |
| 2004/0002567 A1 | 1/2004 | Chen et al. |
| 2005/0215153 A1 | 9/2005 | Cossement et al. |

FOREIGN PATENT DOCUMENTS

| | | |
|---|---|---|
| EP | 1 849 486 | 10/2007 |
| WO | WO 96/26164 | 8/1996 |
| WO | WO 98/02496 | 1/1998 |
| WO | WO 01/96254 A1 | 12/2001 |

* cited by examiner

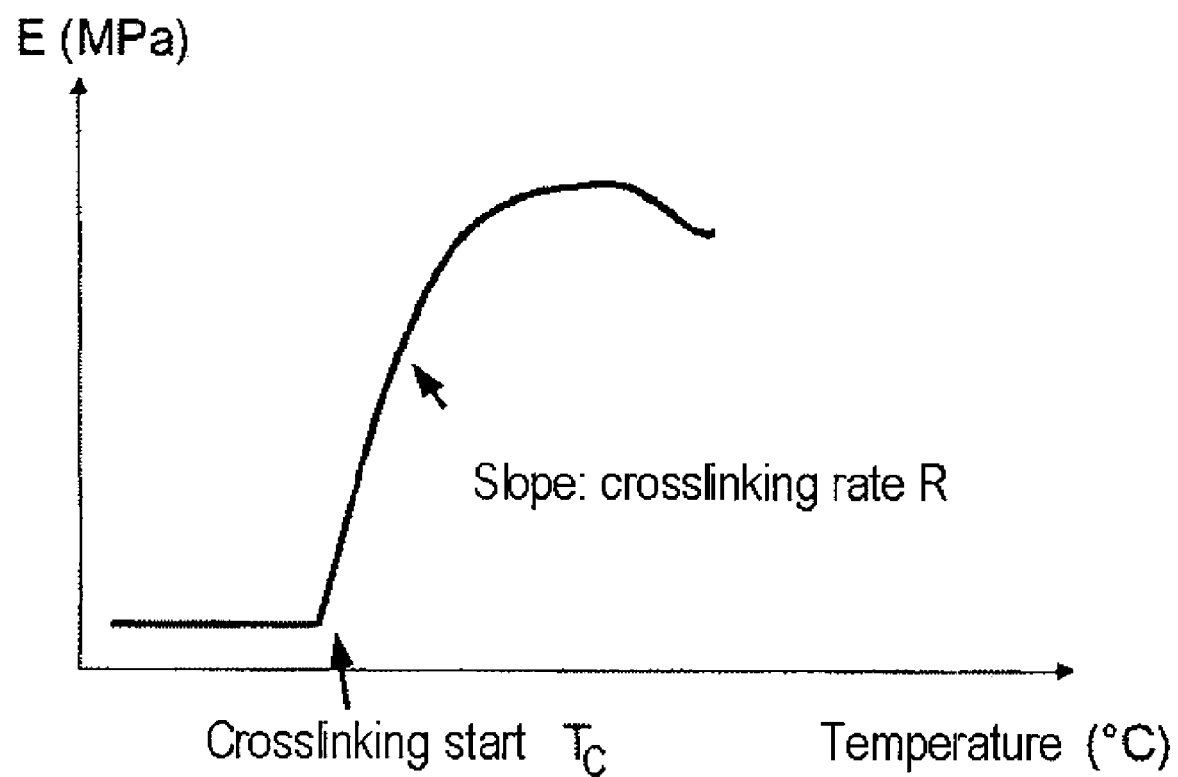

US 8,197,587 B2

SIZING COMPOSITION FOR MINERAL WOOL COMPRISING A MONOSACCHARIDE AND/OR A POLYSACCHARIDE AND AN ORGANIC POLYCARBOXYLIC ACID, AND INSULATING PRODUCTS OBTAINED

CROSS REFERENCE TO RELATED APPLICATIONS

This application is a continuation of U.S. patent application Ser. No. 12/746,101 filed on Jul. 13, 2010, which is the U.S. National Stage of PCT/FR2008/052203, filed Dec. 4, 2008, which in turn claims priority to French Application No. 0759580, filed Dec. 5, 2007, the contents of all applications being incorporated herein by reference in their entirety.

FIELD

The present invention relates to the field of thermal and/or acoustic insulating products based on mineral wool, in particular glass or rock, and on a formaldehyde-free organic binder.

BACKGROUND

The manufacture of insulating products based on mineral wool generally comprises a stage of manufacture of the wool itself, which can be carried out by various processes, for example according to the known technique of fiberizing by internal or external centrifugation. The centrifugation consists in introducing the molten mineral material (glass or rock) into a centrifugal device comprising a multitude of small orifices, the material being projected towards the peripheral wall of the device under the action of the centrifugal force and escaping therefrom in the form of filaments. On leaving the centrifugal device, the filaments are drawn and carried towards a receiving member by a gas stream having a high temperature and a high speed, in order to form a web of fibres (or mineral wool) there.

In order to provide for the assembly of the fibres together and to make it possible for the web to have cohesion, a sizing composition comprising a thermosetting resin is projected onto the fibres, on the route between the outlet of the centrifugal device and the receiving member. The web of fibres coated with the size is subjected to a heat treatment, at a temperature generally of greater than 100° C., in order to bring abut the polycondensation of the resin and to thus obtain a thermal and/or acoustic insulating product having specific properties, in particular dimensional stability, tensile strength, thickness recovery after compression and homogeneous colour.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibres by spraying.

The properties of the sizing composition depend largely on the characteristics of the resin. From the viewpoint of the application, it is necessary for the sizing composition to exhibit good sprayability and to be able to be deposited at the surface of the fibres in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as non-polluting, that is to say for it to comprise— and for it generate during the sizing stage or subsequently— as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibres, in particular glass fibres, and are relatively inexpensive.

These resols are obtained by condensation of phenol and formaldehyde, in the presence of a basic catalyst, in a formaldehyde/phenol molar ratio of greater than 1, so as to promote the reaction between the phenol and the formaldehyde and to reduce the level of residual phenol in the resin. The condensation reaction between the phenol and the formaldehyde is carried out while limiting the degree of condensation of the monomers, in order to avoid the formation of long, relatively water-insoluble, chains which reduce the dilutability. Consequently, the resin comprises a certain proportion of unreacted monomer, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost because it is possible to introduce it in a relatively large amount without affecting the operating qualities of the resin, in particular without harming the mechanical properties of the final product, which significantly lowers the total cost of the resin.

Nevertheless, it has been observed that, under the temperature conditions to which the web is subjected in order to obtain crosslinking of the resin, the urea-formaldehyde condensates are not stable; they decompose with restoration of the formaldehyde and urea, in its turn at least partially decomposed to give ammonia, which are released into the atmosphere of the factory.

Regulations with regard to environmental protection, which are becoming more restrictive, are forcing manufacturers of insulating products to look for solutions which make it possible to further lower the levels of undesirable emissions, in particular of formaldehyde.

Solutions in which resols are replaced in sizing compositions are known and are based on the use of a carboxylic acid polymer, in particular an acrylic acid polymer.

In U.S. Pat. No. 5,340,868, the size comprises a polycarboxylic polymer, a β-hydroxyamide and an at least trifunctional monomeric carboxylic acid.

Provision has been made for sizing compositions comprising a polycarboxylic polymer, a polyol and a catalyst, which catalyst is a phosphorus-comprising catalyst (U.S. Pat. No. 5,318,990, U.S. Pat. No. 5,661,213, U.S. Pat. No. 6,331,350, US 2003/0008978), a fluoroborate (U.S. Pat. No. 5,977,232) or else a cyanamide, a dicyanamide or a cyanoguanidine (U.S. Pat. No. 5,932,689).

A description has also been given of sizing compositions comprising an alkanolamine including at least two hydroxyl groups and a polycarboxylic polymer (U.S. Pat. No. 6,071,994, U.S. Pat. No. 6,099,773, U.S. Pat. No. 6,146,746) in combination with a copolymer (U.S. Pat. No. 6,299,936).

In US 2002/0091185, the polycarboxylic polymer and the polyol are used in amounts such that the ratio of the number of equivalents of OH groups to the number of equivalents of COOH groups varies from 0.6/1 to 0.8/1.

In US 2002/0188055, the sizing composition comprises a polycarboxylic polymer, a polyol and a cationic, amphoteric or nonionic surfactant.

In US 2004/0002567, the sizing composition includes a polycarboxylic polymer, a polyol and a coupling agent of silane type.

In US 2005/0215153, a description is given of a size formed by a prebinder comprising polymer of carboxylic acid and of a polyol, and from a dextrin as cobinder.

Furthermore, an adhesive composition based on heat-crosslinkable polysaccharides which can be used as size for mineral wool is known (U.S. Pat. No. 5,895,804). The composition comprises a polycarboxylic polymer having at least two carboxylic acid functional groups and a molecular weight at least equal to 1000 and a polysaccharide having a molecular weight at least equal to 10 000.

SUMMARY

The invention more particularly relates to a sizing composition capable of crosslinking to form the said organic binder, which includes at least one monosaccharide and/or one polysaccharide and at least one organic polycarboxylic acid having a molar mass of less than 1000, to the process for the preparation of the said sizing composition and to the insulating products which result therefrom.

The aim of the present invention is to provide a sizing composition for insulating products based on mineral wool which is devoid of formaldehyde, thus making it possible to have available an alternative to the sizing compositions based on resols.

Another aim is to provide a sizing composition prepared from natural compounds resulting from renewable sources, in particular plant sources, or produced by microbial fermentation.

In order to achieve these aims, the present invention provides a sizing composition for insulating products based on mineral wool, in particular on glass or rock, which comprises:
at least one monosaccharide and/or at least one polysaccharide, and
at least one organic polycarboxylic acid having a molar mass of less than or equal to 1000.

BRIEF DESCRIPTION OF THE DRAWINGS

FIG. 1 shows the variation in the modulus of elasticity E (in MPa) as a function of the temperature (in ° C.) from measurements according to an embodiment.

DETAILED DESCRIPTION

The monosaccharide is chosen from monosaccharides including from 3 to 8 carbon atoms, preferably aldoses and advantageously aldoses comprising from 5 to 7 carbon atoms. The aldoses which are particularly preferred are natural aldoses (belonging to the D series), in particular hexoses, such as glucose, mannose and galactose.

The polysaccharide in accordance with the invention is chosen from polysaccharides having a weight-average molar mass of less than 100 000, preferably of less than 50 000, advantageously of less than 10 000 and better still of greater than 180.

Advantageously, the polysaccharide exhibits a polydispersity index (PI), defined by the ratio of the weight-average molar mass to the number-average molar mass, which is less than or equal to 10.

Preferably, the polysaccharide includes at least one unit chosen from the abovementioned aldoses, advantageously glucose. The polysaccharides which are predominantly (to more than 50% by weight) composed of glucose units are particularly preferred.

According to a preferred embodiment, the invention uses a mixture of monosaccharide(s) and/or of polysaccharide(s), obtained in particular from plants, especially a dextrin or a molasses.

Dextrins are compounds corresponding to the general formula $(C_6H_{10}O_5)_n$ obtained by partial hydrolysis of starch. The processes for the preparation of dextrins are known. For example, dextrins can be prepared by heating or by drying to dryness a starch, generally in the presence of an acid catalyst, which results in the constituent amylose and amylopectin molecules of the said starch being ruptured to give products of lower molar mass. Dextrins can also be obtained by treating the starch enzymatically with one or more amylases, in particular microbial amylases, capable of hydrolyzing the bonds of the starch. The nature of the treatment (chemical or enzymatic) and the hydrolysis conditions have a direct effect on the average molar mass and the distribution of the molar masses of the dextrin.

The dextrins in accordance with the invention can be obtained from starch or starch derivatives of varied plant origin, for example resulting from tubers, such as potato, manioc, maranta and sweet potato, resulting from grains, such as wheat, corn, rye, rice, barley, millet, oats and sorghum, resulting from fruit, such as horse chestnut, sweet chestnut and hazelnut, or resulting from leguminous plants, such as peas and beans.

Preference is given in particular to dextrins having a dextrose equivalent DE of greater than or equal to 5, preferably of greater than or equal to 10, advantageously of greater than or equal to 15 and better still of less than 100.

Conventionally, the dextrose equivalent DE is defined by the following relationship:

$$DE = 100 \times \left( \frac{\text{number of glycoside bonds cleaved}}{\text{number of glycoside bonds in the starting starch}} \right)$$

The molasses are residues from the refining of sugar extracted in particular from cane and beet which comprise a high content of glucides, of the order of 40 to 60% by weight. Sucrose constituents the bulk of the glucides of the molasses.

The molasses in accordance with the invention preferably include from 45 to 50% by weight of total glucides, expressed as sucrose.

Beet molasses are particularly preferred.

The term "organic polycarboxylic acid" is understood to mean an organic acid comprising at least two carboxyl functional groups, preferably at most 4 carboxyl functional groups and advantageously at most 3 carboxyl functional groups.

The organic polycarboxylic acid acts as crosslinking agent; it is capable of reacting with the monosaccharide(s) and/or polysaccharide(s) under the effect of heat to form ester bonds which result in a polymeric network being obtained in the final binder. The said polymeric network makes it possible to establish bonds at the junction points of the fibres in the mineral wool.

The organic polycarboxylic acid is chosen from organic polycarboxylic acids exhibiting a molar mass of less than or equal to 1000, preferably of less than or equal to 750 and advantageously of less than or equal to 500.

Preferably, the organic polycarboxylic acid is a saturated or unsaturated and linear or branched alicyclic acid, a cyclic acid or an aromatic acid.

The organic polycarboxylic acid can be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, in particular comprising at least one boron or chlorine atom, tetrahydrophthalic acid and its derivatives, in particular comprising at least one chlorine atom, such as chlorendic acid, isophthalic acid, terephthalic acid, mesaconic acid and citraconic acid, or a dicarboxylic acid precursor, in particular an anhydride, such as maleic anhydride, succinic anhydride and phthalic anhydride; a tricarboxylic acid, for example citric acid, tricarballylic acid, 1,2,4-butanetricarboxylic acid, aconitic acid, hemimellitic acid, trimellitic acid and trimesic acid; or a tetracarboxylic acid, for example 1,2,3,4-butanetetracarboxylic acid and pyromellitic acid.

In the sizing composition, the monosaccharide and/or the polysaccharide represents from 10 to 90% of the weight of the mixture composed of the monosaccharide and/or the polysaccharide and the organic polycarboxylic acid, preferably from 20 to 85% and advantageously from 30 to 80%.

The sizing composition can additionally comprise an acid or basic catalyst which has in particular the role of adjusting the temperature at which crosslinking begins.

The catalyst can be chosen from Lewis bases and acids, such as clays, colloidal or noncolloidal silica, organic amines, quaternary amines, metal oxides, metal sulphates, metal chlorides, urea sulphates, urea chlorides and catalysts based on silicates.

The catalyst can also be a phosphorus-comprising compound, for example an alkali metal hypophosphite salt, an alkali metal phosphite, an alkali metal polyphosphate, an alkali metal hydrogenphosphate, a phosphoric acid or an alkylphosphonic acid. Preferably, the alkali metal is sodium or potassium.

The catalyst can also be a compound comprising fluorine and boron, for example tetrafluoroboric acid or a salt of this acid, in particular an alkali metal tetrafluoroborate, such as sodium tetrafluoroborate or potassium tetrafluoroborate, an alkaline earth metal tetrafluoroborate, such as calcium tetrafluoroborate or magnesium tetrafluoroborate, a zinc tetrafluoroborate and an ammonium tetrafluoroborate.

Preferably, the catalyst is sodium hypophosphite, sodium phosphite and the mixtures of these compounds.

The amount of catalyst introduced into the sizing composition can represent up to 20% of the weight of the monosaccharide and/or polysaccharide and organic polycarboxylic acid, preferably up to 10%, and advantageously is at least equal to 1%.

The sizing composition in accordance with the invention can additionally comprise the conventional additives below in the following proportions, calculated on the basis of 100 parts by weight of monosaccharide(s) and/or polysaccharide(s) and organic polycarboxylic acid:
  from 0 to 2 parts of silane, in particular an aminosilane,
  from 0 to 20 parts of oil, preferably from 4 to 15 parts,
  from 0 to 30 parts of urea and/or of glycerol, preferably from 0 to 20 parts,
  from 0 to 5 parts of a silicone,
  from 0 to 30 parts of an "extender" chosen from lignin derivatives, such as ammonium lignosulphonate (ALS) or sodium lignosulphonate, and animal or plant proteins.

The role of the additives is known and is briefly restated: the silane is an agent for coupling between the fibres and the binder, and also acts as anti-ageing agent; the oils are dust-preventing and hydrophobic agents; the urea and the glycerol act as plasticizers and make it possible to prevent pregelling of the sizing composition; the silicone is a hydrophobic agent, the function of which is to reduce the absorption of water by the insulating product; the "extender" is an organic filler, soluble or dispersible in the aqueous sizing composition, which makes it possible in particular to reduce the cost of the sizing composition.

The sizing composition exhibits an acidic pH, of the order of 1 to 5 according to the organic polycarboxylic acid used, preferably of greater than or equal to 1.5. Advantageously, the pH is maintained at a value at least equal to 2, so as to limit problems of instability of the sizing composition and of corrosion of the manufacturing line, by virtue of the addition of an amino compound which is incapable of reacting with the monosaccharide and/or the polysaccharide, for example a tertiary amine, in particular triethanolamine. The amount of amino compound can represent up to 30 parts by weight of the total weight of monosaccharide and/or of polysaccharide and of organic polycarboxylic acid.

The sizing composition is intended to be applied to mineral fibres, in particular glass or rock fibres.

Conventionally, the sizing composition is projected onto the mineral fibres at the outlet of the centrifugal device and before they are collected on the receiving member in the form of a web of fibres which is subsequently treated at a temperature which makes possible the crosslinking of the size and the formation of an infusible binder. The crosslinking of the size according to the invention takes place at a temperature comparable to that of a conventional formaldehyde-phenol resin, at a temperature of greater than or equal to 110° C., preferably of greater than or equal to 130° C. and advantageously of greater than or equal to 140° C.

The acoustic and/or thermal insulating products obtained from these sized fibres also constitute a subject-matter of the present invention.

These products are generally provided in the form of a mat or felt of mineral wool, of glass or of rock, or also of a veil of mineral fibres, also of glass or of rock, intended in particular to form a surface coating on the said mat or felt.

The following examples make it possible to illustrate the invention without, however, limiting it.

In these example, the following are measured:
  the weight-average molar mass and the number-average molar mass of the dextrins by gel permeation chromatography under the following conditions:
  three columns arranged in series: two ViscoGEL® columns filled with GMPWxl ("mixed bed" columns) and one ViscoGEL® column filled with G2500PWxl ("single bed" column). These columns are sold by Viscotek
  eluent: PBS buffer (saline solution based on sodium chloride and phosphate with a pH of approximately 7.4)
  temperature: 35° C.
  detectors: differential refractometry, viscosimetry and light scattering,
  the crosslinking start temperature ($T_C$) and the crosslinking rate (R) by the Dynamic Mechanical Analysis (DMA) method, which makes it possible to characterize the viscoelastic behaviour of a polymeric material. The procedure is as follows: a sample of Whatman paper is impregnated with the sizing composition (content of organic solids of the order of 40%) and is then fixed horizontally between two jaws. An oscillating component equipped with a device for measuring the stress as a function of the strain applied is positioned on the upper face of the sample. The device makes it possible to calculate the modulus of elasticity E. The sample is heated to a temperature varying from 20 to 250° C. at a rate of 4° C./min. The curve of variation in the modulus of elasticity E (in MPa) as a function of the temperature (in ° C.) is plotted from the measurements, the general appearance of the curve being given in FIG. 1. The values corresponding to the crosslinking start temperature ($T_C$), in ° C., and the slope corresponding to the crosslinking rate (R), in MPa/° C., are determined on the curve.

the contact angle of the sizing composition on a glass substrate.

the tensile strength according to Standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is moveable and is moved at a constant rate. The breaking force F (in gram-force) of the sample is measured and the tensile strength TS, defined by the ratio of the breaking force F to the weight of the sample, is calculated.

The tensile strength is measured after manufacture (initial tensile strength) and after accelerated ageing in an autoclave at a temperature of 105° C. under 100% relative humidity for 15 minutes (TS 15).

the initial thickness of the insulation product and the thickness after compressing for 1 hour, 24 hours, 30 days and 90 days with a degree of compression (defined as being the ratio of the nominal thickness to the thickness under compression) equal to 6/1 (Examples 22 to 24) or 5/1 (Examples 25 to 34). The thickness measurements make it possible to evaluate the good dimensional behaviour of the product.

the water absorption under the conditions of Standard EN 1609, expressed as kg of water absorbed per $m^2$ of insulating product. The insulating products exhibiting a water absorption of less than 1 kg/$m^2$ are regarded as having a low short-term (24 hours) water absorption; they belong to the "WS" category according to the ACERMI certification.

the five resistance measured according to Standard EN ISO 1182. The products belonging to the "Euroclass A1" class do not contribute to the declaration and to the propagation of the fire.

the thermal conductivity coefficient λ according to Standard EN 13162, expressed in W/(m×° K).

the amount of formaldehyde emitted by the product after testing for 3 days under the conditions of Standard ISO 16000-9 and with a ratio of the change in air to the level of charging of the chamber Q equal to 0.4. The amount of formaldehyde is measured according to the method described in Standard ISO 16000-3. The results are expressed in μg of formaldehyde emitted per $m^2$ and per hour.

Examples 1 to 6

Sizing compositions are prepared which comprise the constituents appearing in Table 1, expressed as parts by weight.

The molasses is a beet molasses for industrial use (sold by France Masses) which is provided in the form of a viscous and homogeneous liquid comprising from 43 to 53% by weight of sugars, expressed as sucrose.

The sizing compositions are prepared by successively introducing, into a vessel containing water, the molasses, citric acid and sodium hypophosphite (catalyst) with vigorous stirring until the constituents have completely dissolved.

The properties of the sizing compositions which appear in Table 1 are evaluated in comparison with a conventional sizing composition including a formaldehyde-phenol resin and urea (Reference) prepared in accordance with Example 2, Test 1, of WO 01/96254 A1.

The sizing compositions of Examples 1 to 6 have similar properties to those of the Reference in terms of crosslinking start temperature (Tc), of viscosity and of contact angle. The crosslinking rate (R) remains lower than that of the Reference.

Examples 7 to 21

The operation is carried out under the conditions of Example 1 to 6 modified in that use is made of a dextrin resulting from corn starch (maltodextrin) having the following characteristics:

a weight-average molar mass equal to 5500, a polydispersity index PI equal to 9.5 and a dextrose equivalent DE of between 16.5 and 19.5 (sold under the reference 419699 by Aldrich; solids contents: 100%): Examples 7 to 12, a weight-average molar mass equal to 1850, a polydispersity index PI equal to 4.45 and a dextrose equivalent DE equal to 30 (sold under the reference Tackidex® 30L75 by Roquette Frères; solids content: 75%): Examples 13 to 15, a weight-average molar mass equal to 1520, a polydispersity index PI equal to 5.72 and a dextrose equivalent DE equal to 62 (sold under the reference Flolys® B6080S by Roquette Frères; solids content: 81%): Examples 16 to 18, a glucose content by weight of greater than 95% and a dextrose equivalent DE equal to 99 (sold under the reference glucose syrup 74/968® by Roquette Frères; solids content: 75%): Examples 19 to 21.

The contents of the constituents of the sizing compositions are given in Table 2, in parts by weight.

The sizing compositions of Examples 8 to 15, 18 and 21 advantageously exhibit a lower crosslinking start temperature ($T_C$) than that of the Reference, The presence of the catalyst in the composition of Example 9 makes it possible to significantly reduce the crosslinking start temperature in comparison with the composition of Example 7, with, however, a reduction in the crosslinking rate (R).

The sizing compositions according to the invention exhibit a low viscosity, similar to that of the Reference, for the same solids content (40%), indeed even lower, which allows good application to the mineral fibres, in particular when application is carried out by spraying.

These compositions also exhibit a similar contact angle to that of the Reference, which denotes good wettability of the fibres by the sizing composition.

Examples 22 to 24

The compositions of Examples 2, 4 and 10, and also the formaldehyde-phenol resin (Reference), are used to form insulation products based on glass wool.

Glass wool is manufactured by the internal centrifugation technique in which the molten glass composition is converted into fibres by means of a tool, referred to as centrifuging disc, comprising a basket forming a chamber for receiving the molten composition and a peripheral band pierced by a multitude of orifices: the dish is rotated about its vertically positioned axis of symmetry, the composition is ejected through the orifices under the effect of the centrifugal force and the material escaping from the orifices is drawn into fibres with the assistance of a drawing gas stream.

Conventionally, a size spraying ring is positioned beneath the fiberizing disc so as to uniformly distribute the sizing composition over the glass wool which has just been formed.

The mineral wool, thus sized, is collected on a belt conveyor equipped with internal extraction boxes which hold the mineral wool in the form of a felt or web at the surface of the conveyor. The felt or the web is cut up and then placed in an oven maintained at 220° C. where the constituents of the size polymerize to form a binder.

TABLE 1

|  | Ex. 1 | Ex. 2 | Ex. 3 | Ex. 4 | Ex. 5 | Ex. 6 | Ref. |
|---|---|---|---|---|---|---|---|
| Composition |  |  |  |  |  |  |  |
| Molasses | 30 | 40 | 50 | 60 | 70 | 80 | — |
| Citric acid | 70 | 60 | 50 | 40 | 30 | 20 | — |
| Sodium hypophosphite | 5 | 5 | 5 | 5 | 5 | 5 | — |
| Properties |  |  |  |  |  |  |  |
| Crosslinking start temperature $T_C$ (° C.) | 151 | 149 | 149 | 155 | 156 | 156 | 151 |
| Crosslinking rate R (MPa/° C.) | 58 | 69 | 65 | 59 | 40 | 41 | 161 |
| Viscosity at 25° C. (mPa · s) [1] | 7.8 | 7.8 | 8.0 | 7.8 | 7.2 | 7.5 | 8.0 |
| Viscosity at 50° C. (mPa · s) [1] | 5.9 | 6.0 | 5.9 | 6.1 | 5.8 | 6.0 | 6.0 |
| Contact angle (°) [1] | 4 | 6 | 8 | 12 | 11 | 12 | 10 |

[1] solution with a solids content of 40%

TABLE 2

| Example | 7 | 8 | 9 | 10 | 11 | 12 | 13 | 14 | 15 | 16 | 17 | 18 | 19 | 20 | 21 | Ref. |
|---|---|---|---|---|---|---|---|---|---|---|---|---|---|---|---|---|
| Composition |  |  |  |  |  |  |  |  |  |  |  |  |  |  |  |  |
| Dextrin |  |  |  |  |  |  |  |  |  |  |  |  |  |  |  |  |
| 419699 | 40 | 30 | 40 | 50 | 60 | 70 | — | — | — | — | — | — | — | — | — | — |
| Tackidex 30L75 | — | — | — | — | — | — | 80 | 70 | 60 | — | — | — | — | — | — | — |
| Flolys | — | — | — | — | — | — | — | — | — | 80 | 70 | 60 | — | — | — | — |
| Glucose syrup 74/968 | — | — | — | — | — | — | — | — | — | — | — | — | 80 | 70 | 60 | — |
| Citric acid | 60 | 70 | 60 | 50 | 40 | 30 | 20 | 30 | 40 | 20 | 30 | 40 | 20 | 30 | 40 | — |
| Sodium hypophosphite | 0 | 5 | 5 | 5 | 5 | 5 | 5 | 5 | 5 | 5 | 5 | 5 | 5 | 5 | 5 | — |
| Properties |  |  |  |  |  |  |  |  |  |  |  |  |  |  |  |  |
| Crosslinking start temperature $T_C$ (° C.) | 171 | 144 | 132 | 131 | 132 | 130 | 120 | 120 | 120 | 152 | 151 | 120 | 165 | 151 | 135 | 151 |
| Crosslinking rate R (MPa/° C.) | 105 | 62 | 63 | 67 | 72 | 76 | 27 | 45 | 57 | 42 | 48 | 46 | 67 | 42 | 32 | 161 |
| Viscosity at 25° C. (mPa · s) [1] | 9.3 | 9.4 | 10.0 | 11.0 | 12.0 | 12.0 | 7.4 | 7.0 | 7.0 | 6.6 | 6.4 | 6.0 | 6.2 | 5.9 | 5.5 | 8.0 |
| Viscosity at 50° C. (mPa · s) [1] | 6.8 | 7.1 | 7.6 | 7.9 | 9.3 | 8.6 | 5.3 | 5.0 | 5.1 | 5.2 | 5.4 | 5.0 | 5.0 | 4.7 | 4.6 | 6.0 |
| Contact angle (°) [1] | 6.0 | 6.0 | 6.0 | 8.0 | 8.0 | 12.0 | 5.7 | 5.9 | 6.0 | 11.9 | 11.0 | 10.8 | 9.5 | 9.0 | 8.1 | 10.0 |

[1] solution with a solids content of 40%

The values of the tensile strength before and after ageing, and the initial thickness and the recovery in thickness after compressing for 24 hours and 30 days, are collated in Table 3.

Examples 25 to 34

These examples illustrate the manufacture of insulating products on an industrial line.

The mineral wool is continuously produced under the conditions of Examples 22 to 24 on a line with a width of 2.40 m. The mineral wool coated with the sizing composition subsequently passes continuously into an oven at 290° C.

The insulating product obtained at the outlet of the oven exhibits a thickness of the order of 82 mm, a density equal to 17.5 kg/m³ and a loss on ignition equal to 5%.

The sizing compositions used are prepared by introducing the constituents of Table 4 with stirring into a vessel containing water.

The properties of the insulating products are evaluated in comparison with the reference sizing composition (recorded as Ref.) described in Examples 1 to 6. The measurements appear in Table 4.

TABLE 3

|  | Ex. 22 | Ex. 23 | Ex. 24 | Ref. |
|---|---|---|---|---|
| Sizing composition | Ex. 2 | Ex. 4 | Ex. 10 | Ref. |
| Tensile strength |  |  |  |  |
| Before ageing | 298 | 260 | 226 | 336 |
| After ageing | 220 | 175 | 180 | 280 |
| Loss (%) | 26.2 | 32.7 | 20.3 | 16.7 |
| Thickness (mm) |  |  |  |  |
| Initial | 134 | 134 | 143 | 127 |
| 24 hours | 89 | 90 | 94 | 102 |
| 30 days | 81 | 80 | 91 | 98 |

TABLE 4

| Example | 25 | 26 | 27 | 28 | 29 | 30 | 31 | 32 | 33 | 34 | Ref. |
|---|---|---|---|---|---|---|---|---|---|---|---|
| Sizing composition | | | | | | | | | | | |
| Glucose syrup 74/968 | 49.0 | 49.0 | 49.0 | 64.0 | 34.3 | 34.3 | — | — | — | — | — |
| Tackidex 30L75 | — | — | — | — | — | — | 55.0 | 55.0 | — | — | — |
| Roclys C3072S[(2)] | — | — | — | — | — | — | — | — | 62.0 | 39.2 | — |
| Citric acid | 51.0 | 51.0 | 51.0 | 36.0 | 47.2 | 47.2 | 45.0 | 45.0 | 38.0 | 43.6 | — |
| Sodium hypophosphite | 5.0 | 2.8 | 2.8 | 5.0 | 5.0 | 5.0 | 2.8 | 2.8 | 5.0 | 5.0 | — |
| Glycerol | — | — | 10 | — | — | — | — | 10.0 | — | 5.0 | — |
| γ-Aminopropyltri-ethoxysilane | 1.0 | 1.0 | 1.0 | 1.0 | 1.0 | 1.0 | 1.0 | 1.0 | 1.0 | 1.0 | — |
| Mineral oil | 9.5 | 9.5 | 9.5 | — | 9.5 | 9.5 | 9.5 | 9.5 | 9.5 | 9.5 | — |
| Silicone | — | — | — | — | — | 1.0 | — | — | — | — | — |
| Triethanolamine | — | — | — | — | 18.5 | 18.5 | — | — | — | 17.0 | — |
| pH | n.d. | n.d. | n.d. | 1.60 | 2.80 | 2.80 | n.d. | n.d. | 1.49 | 2.75 | 4.92 |
| Insulation product Tensile strength (gf/g) | | | | | | | | | | | |
| Before ageing | 318 | 308 | 356 | 404 | 431 | 389 | 304 | 355 | 382 | 385 | 459 |
| After ageing | 278 | 314 | 325 | 323 | 332 | 274 | 294 | 310 | 337 | 324 | 389 |
| Loss (%) | 13 | −2 | 9 | 20 | 23 | 30 | 3 | 13 | 12 | 16 | 15 |
| Thickness (mm) | | | | | | | | | | | |
| 1 hour | 81.1 | 78.8 | 77.0 | 80.8 | 79.8 | 79.6 | 83.8 | 81.1 | 80.8 | 81.6 | 78.3 |
| 24 hours | 78.4 | 75.2 | 71.1 | 76.2 | 78.1 | 78.3 | 77.2 | 75.0 | 78.4 | 78.0 | 74.0 |
| 30 days | 78.4 | 74.1 | 71.1 | 75.0 | 76.9 | 77.4 | 75.2 | 73.1 | 68.8 | 77.3 | 72.2 |
| 90 days | 73.6 | 74.4 | 72.4 | n.d. | n.d. | n.d. | 78.7 | 75.3 | n.d. | n.d. | 73.8 |
| Water absorption (kg/m$^3$) | n.d. | 0.44 | 0.77 | 2.56 | 1.65 | 0.62 | 7.31 | 7.01 | n.d. | n.d. | 0.97 |
| Fire resistance (Euroclass A1) | n.d. | yes | n.d. | n.d. | n.d. | n.d. | yes | n.d. | n.d. | n.d. | yes |
| λ (W/(m × °K) | 0.0336 | 0.0336 | 0.0336 | 0.0332 | n.d. | 0.0344 | 0.0336 | 0.0337 | 0.0347 | 0.0345 | 0.0332 |
| Formaldehyde emitted (μg/m$^2$/h) | n.d. | <0.8 | n.d. | n.d. | <0.8 | n.d. | <0.8 | n.d. | n.d. | n.d. | 22-25 | n.d.: not determined

[(2)] dextrin resulting from corn starch; weight-average molar mass: 3510; polydispersity index PI: 5.2; dextrose equivalent DE: 30; sold by Roquette Frères

What is claimed is:

1. A sizing composition for insulating products based on mineral wool, the composition comprising:
   at least one dextrin,
   at least one organic polycarboxylic acid having a molar mass of less than 1000, and
   a catalyst chosen from phosphorus-comprising compounds and compounds comprising fluorine and boron.

2. The composition of claim 1, wherein the dextrin exhibits a dextrose equivalent of greater than or equal to 5.

3. The composition of claim 2, wherein the dextrin exhibits a dextrose equivalent of greater than or equal to 10.

4. The composition of claim 3, wherein the dextrin exhibits a dextrose equivalent of greater than or equal to 15.

5. The composition of claim 1, wherein the organic polycarboxylic acid comprises at most 4 carboxyl functional groups.

6. The composition of claim 1, wherein the organic polycarboxylic acid is citric acid.

7. The composition of claim 1, wherein the dextrin represents from 10 to 90% of the weight of the mixture composed of the dextrin and the organic polycarboxylic acid.

8. The composition of claim 7, wherein the dextrin represents from 20 to 85% of the weight of the mixture composed of the dextrin and the organic polycarboxylic acid.

9. The composition of claim 8, wherein the dextrin represents from 30 to 80% of the weight of the mixture composed of the dextrin and the organic polycarboxylic acid.

10. The composition of claim 1, wherein the catalyst is sodium hypophosphite.

11. The composition of claim 10, wherein the catalyst represents more than zero up to 20% of the weight of the mixture composed of the dextrin and the organic polycarboxylic acid.

12. The composition of claim 11, wherein the catalyst represents more than zero up to 10% of the weight of the mixture composed of the dextrin and the organic polycarboxylic acid.

13. The composition of claim 11, wherein the catalyst represents at least 1% of the weight of the mixture composed of the dextrin and the organic polycarboxylic acid.

14. The composition of claim 1, comprising the additives below in the following proportions, calculated on the basis of 100 parts by weight of dextrin and organic polycarboxylic acid:
   from 0 to 2 parts of silane,
   from 0 to 20 parts of oil,
   from 0 to 30 parts of urea and/or glycerol,
   from 0 to 5 parts of a silicone,
   from 0 to 30 parts of an extender chosen from lignin derivatives, and animal or plant proteins.

15. The composition of claim 14, wherein the proportion of oil is from 4 to 15 parts and the proportion of urea and/or glycerol is from 0 to 20 parts.

16. The composition of claim 14, wherein the lignin derivatives include ammonium lignosulphonate (ALS) or sodium lignosulphonate.

17. The composition of claim 14, wherein the silane is an aminosilane.

18. An acoustic and/or thermal insulating product based on mineral wool sized using the sizing composition according to claim 1.

19. The composition of claim 1, wherein the mineral wool is based on rock or glass.

20. A process for the manufacture of an acoustic and/or thermal insulating product based on mineral wool, the process comprising:
   projecting a sizing composition onto said wool; and
   treating said wool at a temperature permitting crosslinking of the sizing composition and formation of an infusible binder,
   wherein the sizing composition comprises:
      at least one dextrin,
      at least one organic polycarboxylic acid having a molar mass of less than 1000, and
      a catalyst chosen from phosphorus-comprising compounds and compounds comprising fluorine and boron.

21. The process of claim 20, wherein the dextrin exhibits a dextrose equivalent of greater than or equal to 5.

22. The process of claim 21, wherein the dextrin exhibits a dextrose equivalent of greater than or equal to 15.

23. The process of claim 20, wherein the organic polycarboxylic acid comprises at most 4 carboxyl functional groups.

24. The process of claim 20, wherein the organic polycarboxylic acid is citric acid.

25. The process of claim 20, wherein the dextrin represents from 30 to 80% of the weight of the mixture composed of the dextrin and the organic polycarboxylic acid.

26. The process of claim 20, wherein the catalyst is sodium hypophosphite.

27. The process of claim 20, wherein the catalyst represents more than zero up to 10% of the weight of the mixture composed of the dextrin and the organic polycarboxylic acid.

28. The process of claim 27, wherein the catalyst represents at least 1% of the weight of the mixture composed of the dextrin and the organic polycarboxylic acid.

29. The process of claim 27, comprising the additives below in the following proportions, calculated on the basis of 100 parts by weight of dextrin and organic polycarboxylic acid:
   from 0 to 2 parts of silane,
   from 0 to 20 parts of oil,
   from 0 to 30 parts of urea and/or glycerol,
   from 0 to 5 parts of a silicone,
   from 0 to 30 parts of an extender chosen from lignin derivatives, and animal or plant proteins.

30. The process of claim 29, wherein the proportion of oil is from 4 to 15 parts and the proportion of urea and/or glycerol is from 0 to 20 parts.

* * * * *